UNITED STATES PATENT OFFICE.

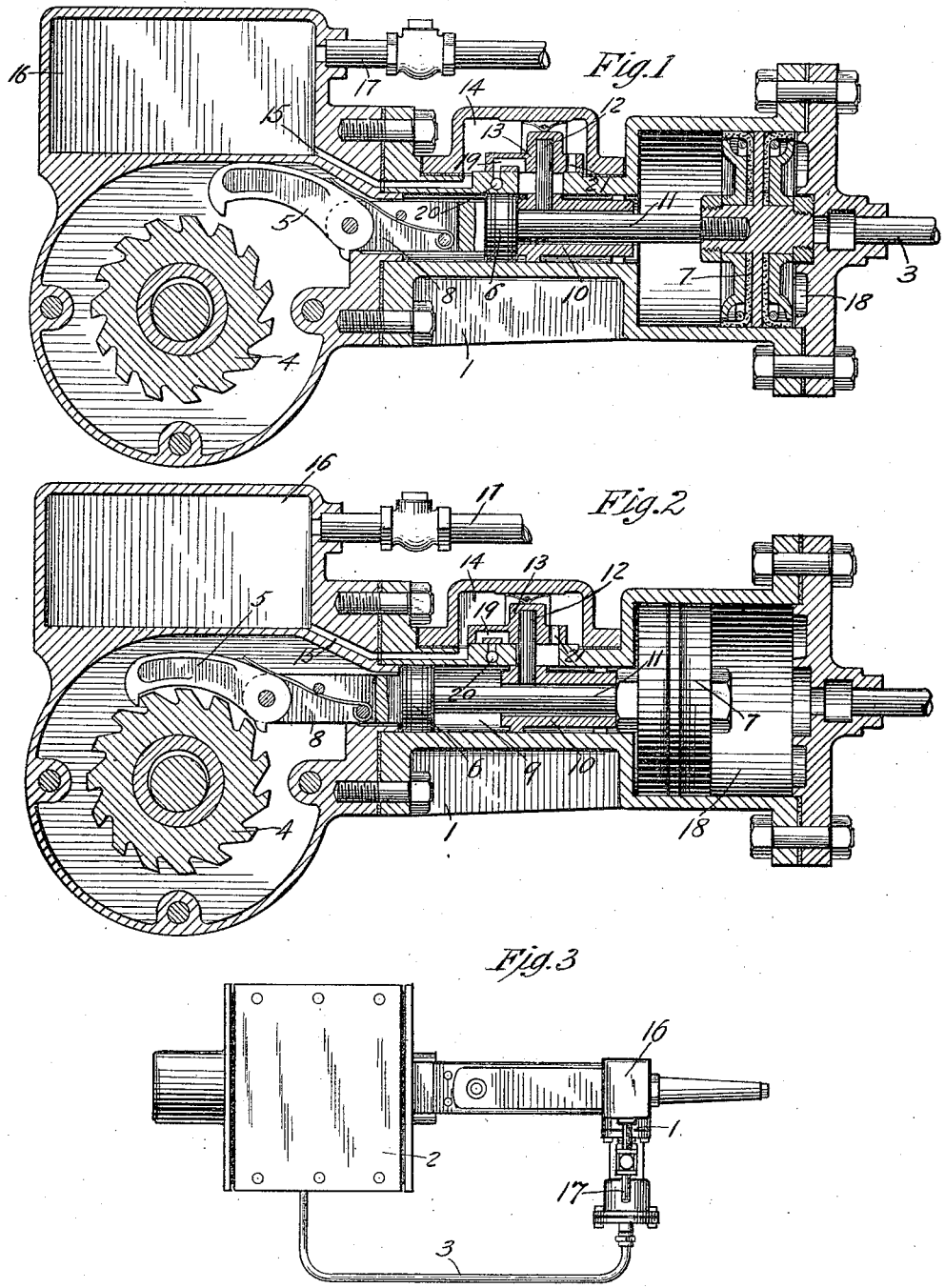

RICHARD C. SWARTZWELDER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

AUTOMATIC SLACK-ADJUSTER.

1,122,436.        Specification of Letters Patent.        Patented Dec. 29, 1914.

Application filed August 5, 1911. Serial No. 642,534.

*To all whom it may concern:*

Be it known that I, RICHARD C. SWARTZWELDER, a citizen of the United States, residing at Edgewood, in the county of Allegheny and State of Pennsylvania, have invented new and useful Improvements in Automatic Slack-Adjusters, of which the following is a specification.

This invention relates to fluid pressure brakes, and more particularly to a slack adjuster for automatically taking up slack when the brake piston travel exceeds a predetermined amount.

The principal object of my invention is to provide an improved pneumatically operated slack adjuster, positive in operation, and of simple, compact construction.

In the accompanying drawing; Figure 1 is a central sectional view of a slack adjuster embodying my improvement, with the parts in normal position; Fig. 2 a similar view, showing the parts in the position assumed upon applying the brakes when the brake piston travel exceeds a predetermined amount; and Fig. 3 a plan view of the slack adjuster applied to a brake cylinder.

As shown in Fig. 3 of the drawing, the slack adjuster 1 may be applied to take up the slack by adjustment of the rear fulcrum block in the usual well known manner or otherwise, and said slack adjuster may be controlled by fluid supplied from the brake cylinder 2 through pipe 3 when the brake cylinder piston travel exceeds a predetermined amount.

My improvement may be applied to any form of slack adjuster in which movement is required to take up the slack, and to illustrate the use of same the invention is shown applied to a well known commercial type of slack adjuster, in which a ratchet wheel 4 is adapted upon rotation by a pawl 5 to cause longitudinal movement of a screw, which movement causes the slack to be taken up. As this form of slack adjuster is clearly described in prior Patent No. 696,521 of H. A. Wahlert, dated April 1, 1902, it will be unnecessary to further describe or illustrate the same in the present application. According to my invention, a piston device having differential piston heads 6 and 7 is provided for operating said pawl, the pawl being pivotally connected to a stem 8 carried by the piston device.

The piston chamber 18 at the outer face of piston head 7 is open to brake cylinder pipe 3 and the outer face of piston head 6 is constantly open to the atmosphere.

The chamber 9 intermediate the piston heads 6 and 7 contains a movable sleeve 10 loosely inclosing the piston rod 11 and carrying a projecting stem 12 adapted to operate a slide valve 13 contained in a valve chamber 14. The sleeve 10 is of such length that the extreme movement of the piston device in one direction is adapted to move the sleeve one way while the extreme movement of the piston device in the opposite direction is adapted to shift the sleeve the opposite way. The valve chamber 14 is connected by a passage 15 with a reservoir 16 which is normally charged with fluid under pressure supplied through pipe 17 either from the train pipe or other suitable source of fluid pressure.

In operation, assuming the parts in the position shown in Fig. 1, the chamber 9 intermediate the piston heads 6 and 7 is connected through a cavity 19 in the valve 13 with an exhaust port 20, so that all sides of the piston device are normally at atmospheric pressure. Upon applying the brakes, if the brake piston travel exceeds the predetermined degree, air from the brake cylinder is admitted through pipe 3 to chamber 18 of the piston head 7. The piston device thereupon shifts the pawl 5 to the position shown in Fig. 2. In this position, the exhaust port 20 is cut off from chamber 9 and a port 21 connects valve chamber 14 with chamber 9, so that fluid under pressure is admitted from the reservoir 16 to the chamber 9. So long as the brakes are applied this pressure will have no effect, as the brake cylinder pressure acting on the full area of piston 7 exceeds the pressure acting on the differential areas of the pistons 6 and 7 in the chamber 9. Upon releasing the brakes, however, the brake cylinder pressure on piston head 7 in chamber 18 is also released and consequently the pressure in chamber 9 is sufficient to shift the piston device to the position shown in Fig. 1, and thereby rotate the ratchet wheel 4 through the action of the pawl 5 to take up the slack. Before the piston device reaches its extreme position the piston head 6 engages the sleeve 10 and shifts the valve 13 so as to cut off the supply port 21 and connect chamber 9 to the exhaust port 20.

It will now be apparent that a simple construction is provided whereby the slack may be positively taken up by the direct action of fluid under pressure.

Having now described my invention, what I claim as new and desire to secure by Letters Patent, is:—

1. A slack adjuster for fluid pressure brakes comprising means for taking up the slack, a valve, and a piston device operated upon an application of the brakes for actuating said valve to supply fluid to said piston device.

2. A slack adjuster for fluid pressure brakes comprising means for taking up the slack, a valve, and a piston device, operated in one direction by fluid under pressure upon applying the brakes, for actuating said valve to supply fluid under pressure to said piston device tending to move said piston device in the opposite direction.

3. The combination with a brake cylinder, of a slack adjuster comprising means for taking up the slack, a piston device for actuating said means, said piston device being operated in one direction by fluid from the brake cylinder when the brake piston travel exceeds a predetermined amount, and a valve operated by said piston device for supplying fluid to same to effect the movement thereof in the opposite direction upon release of fluid at brake cylinder pressure therefrom.

4. A slack adjuster for fluid pressure brakes comprising means for taking up the slack, a differential piston device operated in one direction by fluid from the brake cylinder for actuating said means, and a valve operated by said piston device for supplying fluid to move said piston device in the opposite direction.

5. A slack adjuster for fluid pressure brakes comprising means for taking up the slack, a differential piston device subject on one side to fluid from the brake cylinder for actuating said means, a reservoir normally charged with fluid under pressure, and a valve operated by said piston device for supplying fluid from said reservoir to the differential area of the piston device to thereby shift same upon release of fluid at brake cylinder pressure therefrom.

In testimony whereof I have hereunto set my hand.

RICHARD C. SWARTZWELDER.

Witnesses:
A. M. CLEMENTS,
C. A. ALLSHOUSE.

Copies of this patent may be obtained for five cents each, by addressing the "Commissioner of Patents, Washington, D. C."